Patented Nov. 4, 1930

1,780,634

UNITED STATES PATENT OFFICE

PHILIPP SIEDLER AND AUGUST MOELLER, OF FRANKFORT-ON-THE-MAIN-GRIESHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

LIQUID SUPERSATURATED SOLUTION OF THIOCARBANILIDE

No Drawing. Application filed May 16, 1929, Serial No. 363,705, and in Germany January 28, 1928.

This invention relates to a composition of matter comprising supersaturated solutions of thiocarbanilide (diphenylthiourea) in liquid monamines of the carbocyclic series and is more particularly concerned with a method for stabilizing such solutions against crystallization by incorporating in said solutions small amounts of natural or synthetic resins or substances acting in a manner similar to resins.

Solutions of thiocarbanilide in ortho-toluidine are frequently used as a flotation agent in the so-called froth-flotation process. These solutions are generally prepared by dissolving, say, 20 parts of thiocarbanilide in 80 parts of ortho-toluidine at temperatures ranging from 80° to 100° C. Because of a solution of this kind being supersaturated at normal temperature, the thiocarbanilide has a tendency to crystallize to some extent when or soon after being cooled. This premature crystallization is particularly disturbing when storing and using such solutions at the low temperatures occurring in winter time. This is so for the reason that by the change in the ratio of the constituents of the liquid caused by the crystallization, the efficiency of the solution to be added to the flotation-machine is also changed in an entirely uncontrollable manner. Moreover, the precipitated crystals produce disturbances in the feeding of the flotation agent to the apparatus by obstructing the valves and the tubes of the supply lines.

The difficulties thus encountered in the use of solutions based on ortho-toluidine as a solvent are still more pronounced when technical toluidine, which is a mixture of the three isomers, is employed as a solvent. This has hitherto practically prevented the use of technical toluidine in the art.

We have now discovered that these difficulties may be completely overcome by the incorporation of relatively small amounts of natural or synthetic resins or substances acting somewhat like resins in supersaturated solutions of thiocarbanilide. The addition of these substances results in a perfect stabilization which is so efficient that premature crystallization is reliably obviated within the range of temperatures occurring in the use of the reagent. We have found that a great number of various resins soluble in ortho-toluidine are capable of acting as stabilizing agents in this manner. Tests have been successfully carried out with the following natural and artificial resins: colophony; Venetian turpentine; basic residual resins such as are obtained in the manufacture of homologues of pyridine by the interaction of water containing ammonia on paraldehyde at temperatures up to 200° C; and, further, numerous resins produced by condensation of formaldehyde with primary amines, as described for instance in German Patent 452,009. In the same manner substances not quantitatively soluble in toluidine and having the qualities of resins as, for instance, certain concentrated tars obtainable by low temperature carbonization of lignites and characterized by a softening point of about 30° to 40° C. may be successfully applied.

The stabilizing effect of these resins on supersaturated solutions of thiocarbanilide is so pronounced that it now becomes possible to employ the technically pure toluidine consisting of the three isomers instead of ortho-toluidine without giving rise to premature crystallization; by employing a somewhat increased quantity of the said stabilizing agents also technically pure toluidine may be made to dissolve approximately the same amount of thiocarbanilide as ortho-toluidine which was hitherto considered to be the best solvent.

In the following examples a number of various flotation agents according to our invention and the method of preparing same are given; the solutions obtained being capable of withstanding the temperatures occurring in the use of the reagents without precipitation of thiocarbanilide taking place.

Examples (1) A solution of 20 parts of thiocarbanilide in 80 parts of ortho-toluidine is prepared at a temperature of about 80° to 100° C. In this solution while hot is dissolved:

(a) 1 part of colophony, or
(b) 2 parts of Venetian turpentine, or
(c) 6 parts of a basic residual resin obtained as described above, or
(d) 10 parts of concentrated tar derived from lignites (see above).

The mixtures after cooling down slowly are ready for use in the flotation process of minerals known to be treated with advantage by the thiocarbanilide-toluidine flotation agent.

(2) 20 parts of thiocarbanilide are dissolved in 80 parts of technically pure toluidine at a temperature of about 90° to 100° C. Into this solution 2 parts of colophony are incorporated at said temperature and the mixture is allowed to cool down. It proves to be a stable liquid solution even while storing at a temperature of 20° C. and more below zero.

We claim:

1. A composition of matter comprising a liquid supersaturated solution of thiocarbanilide in technically pure toluidine and containing a quantity ranging from 0.3% to about 20% of resin.

2. A composition of matter comprising a liquid supersaturated solution of thiocarbanilide in technically pure toluidine and containing a quantity ranging from 0.3% to about 20% of colophony.

3. A composition of matter comprising a liquid supersaturated solution of thiocarbanilide in ortho-toluidine and containing about 2% of colophony.

4. A composition of matter comprising a clear liquid solution supersaturated at normal temperature of thiocarbanilide in liquid monamines of the carbocyclic series and containing a quantity of resin ranging from 0.3% to about 20%.

5. A composition of matter comprising a liquid solution of 20 parts of thiocarbanilide in 80 parts of ortho-toluidine, and containing about 2% of colophony.

In testimony whereof we have hereunto set our hands.

PHILIPP SIEDLER.
AUGUST MOELLER.